Patented May 10, 1949

2,469,554

UNITED STATES PATENT OFFICE 2,469,554

THE PROCESS OF PREPARING THE LACTONE OF 2 METHYL 3 HYDROXY 4 CARBOXY 5 HYDROXYMETHYL PYRIDINE

Dorothea Heyl, Rahway, N. J., assignor to Merck & Co., Inc., Rahway, N. J., a corporation of New Jersey No Drawing. Application May 27, 1944, Serial No. 537,732

1 Claim. (Cl. 260—295)

This invention relates generally to novel chemical compounds and to processes of preparing same; more specifically, it relates to the lactone of 2 - methyl - 3-hydroxy-4-carboxy-5-hydroxymethyl-pyridine, its lower alkoxy derivatives and to processes for obtaining these compounds. These novel substances are useful in synthesis of vitamin $B_6$, 2-methyl-3-hydroxy-4:5-dihydroxymethyl-pyridine, to which they can be converted by reduction using either chemical or catalytic reduction methods.

The novel compounds according to this invention are represented by the formula

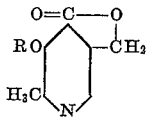

wherein R is hydrogen or a lower alkyl group. These compounds are prepared, in accordance with this invention, by reactions represented as follows:

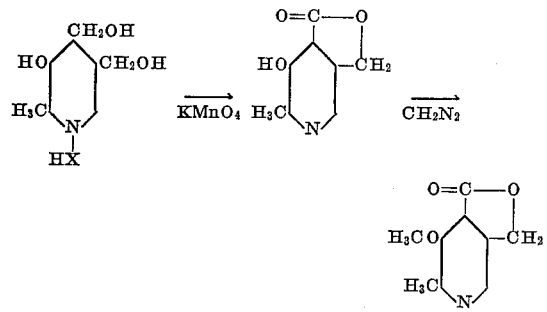

wherein X is a halogen. The reaction is preferably conducted at room temperature in an aqueous solvent.

The following example illustrates a method of carrying out the present invention, but it is to be understood that this example is given by way of illustration and not of limitation.

Example

About 4.12 g. of 2-methyl-3-hydroxy-4:5-dihydroxymethyl-pyridine hydrochloride are dissolved in approximately 150 cc. of water and a saturated aqueous solution containing approximately 4.27 g. of potassium permanganate is slowly added over a period of about 2 hours with agitation during the addition. Precipitated material is removed by filtration and the filtrate is concentrated to dryness, yielding a residue which is twice extracted with hot absolute ethanol. The extract is acidified with alcoholic hydrochloric acid causing precipitation of the lactone of 2-methyl-3-hydroxy-4-carboxy-5-hydroxymethyl-pyridine hydrochloride. The product is purified by recrystallization using water as a solvent, and is converted to the free base, the lactone of 2-methyl-3-hydroxy-4-carboxy-5-hydroxymethyl-pyridine, by treatment in aqueous solution, with sodium bicarbonate solution. This product, the lactone base, when heated decomposes without melting in the range 272-276° C. The free lactone is converted to the lactone of 2 - methyl - 3 - methoxy - 4-carboxy-5-hydroxymethyl-pyridine by treatment of the lactone base in absolute methanol solution with diazomethane. The product is obtained by removing the solvent in vacuo, extracting the residue with ether, treating with decolorizing charcoal and precipitating the desired product with ether. (M. P. 119.5–120° C.)

Mineral acid salts other than the hydrochlorides of the lactone bases can be prepared by treating the bases with the appropriate acid e. g., hydrobromic acid to produce the hydrobromides, sulfuric acid to produce the sulfates, etc.

Compounds of the homologous series of lactones of 2 - methyl - 3 - alkoxy - 4-carboxy-5-hydroxymethyl-pyridine are prepared by treating 2 - methyl - 3 - hydroxy - 4-carboxy-5-hydroxymethyl-pyridine with appropriate alkylating agents instead of the diazomethane used as a methylating agent in the above example.

Modifications may be made in carrying out the present invention without departing from the spirit and scope thereof and the invention is to be limited only by the appended claim.

What is claimed is:

The process that comprises reacting a mineral acid salt of 2-methyl-3-hydroxy-4:5-dihydroxymethyl-pyridine with potassium permanganate in aqueous solution and recovering the lactone of 2 - methyl - 3 - hydroxy - 4 - carboxy-5-hydroxymethyl-pyridine.

DOROTHEA HEYL.

REFERENCES CITED

The following references are of record in the file of this patent:

UNITED STATES PATENTS

| Number | Name | Date |
| --- | --- | --- |
| 2,248,078 | Harris | July 8, 1941 |
| 2,325,053 | Harris | July 27, 1943 |

OTHER REFERENCES

Journal American Chem. Soc. May 1939, p. 1245.
Ichiba Science Papers of Inst. of Physical and Chemical Research (Tokyo), vol. 38 (1941), pp. 347–352.